US008694430B2

(12) United States Patent  
Kobayashi et al.

(10) Patent No.: US 8,694,430 B2  
(45) Date of Patent: Apr. 8, 2014

(54) INFORMATION PROCESSING DEVICE, INFORMATION PROCESSING METHOD, PROGRAM AND STORAGE MEDIUM

(75) Inventors: Yoshinori Kobayashi, Shinagawa-ku (JP); Masanaka Ito, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/511,570

(22) PCT Filed: Nov. 19, 2010

(86) PCT No.: PCT/JP2010/070687  
§ 371 (c)(1),  
(2), (4) Date: May 23, 2012

(87) PCT Pub. No.: WO2011/065305  
PCT Pub. Date: Jun. 3, 2011

(65) Prior Publication Data  
US 2012/0278230 A1 Nov. 1, 2012

(30) Foreign Application Priority Data  
Nov. 24, 2009 (JP) ................................. 2009-266688

(51) Int. Cl.  
*G06Q 40/00* (2012.01)

(52) U.S. Cl.  
USPC ............................................. 705/40; 705/35

(58) Field of Classification Search  
USPC .......................................................... 705/40  
See application file for complete search history.

(56) References Cited

U.S. PATENT DOCUMENTS 5,220,501 A * 6/1993 Lawlor et al. .................... 705/40  
5,383,113 A * 1/1995 Kight et al. ...................... 705/40  
(Continued)

FOREIGN PATENT DOCUMENTS

JP 2002-099849 A 4/2002  
JP 2002-163458 A 6/2002  
(Continued)

OTHER PUBLICATIONS

International Preliminary Report on Patentability for PCT/JP2010/070687 dated Jun. 12, 2012.  
Japanese Patent Office Action dated Apr. 17, 2012 and partial English-language translation thereof.

*Primary Examiner* — James A Vezeris  
(74) *Attorney, Agent, or Firm* — Sughrue Mion, PLLC

(57) ABSTRACT

Provided is an information processing device which enables a user to always and easily recognize an amount to be paid by the user, which results in a reduction of the burden imposed on the user. A debit requesting module (72) requests that a bank debit a bill amount of each transaction of a credit card from a payment account of the credit card. A balance determination module (81) determines whether or not a balance of the payment account is insufficient for the bill amount of the each transaction based on a notification of a result of the debit from the bank. A change module (74) changes, when it is determined that the balance of the payment account is insufficient, a payment method for a bill amount of an item of transactions which uses a variable payment method to a fixed payment method, the fixed payment method being a method of paying a predetermined fixed amount of money as a unit, the variable payment method being a method of making a payment with a payment unit that varies for each transaction depending on an amount of the transaction of the credit card. The present invention is applicable to a server.

9 Claims, 5 Drawing Sheets

(56) References Cited

U.S. PATENT DOCUMENTS

| | | | |
|---|---|---|---|
| 8,383,113 B2 * | 2/2013 | Acton et al. | 424/133.1 |
| 2009/0063342 A1 * | 3/2009 | Beckers | 705/41 |
| 2011/0010294 A1 * | 1/2011 | Chenot | 705/40 |

FOREIGN PATENT DOCUMENTS

| | | |
|---|---|---|
| JP | 2002-183445 A | 6/2002 |
| JP | 2005-056211 A | 3/2005 |

* cited by examiner

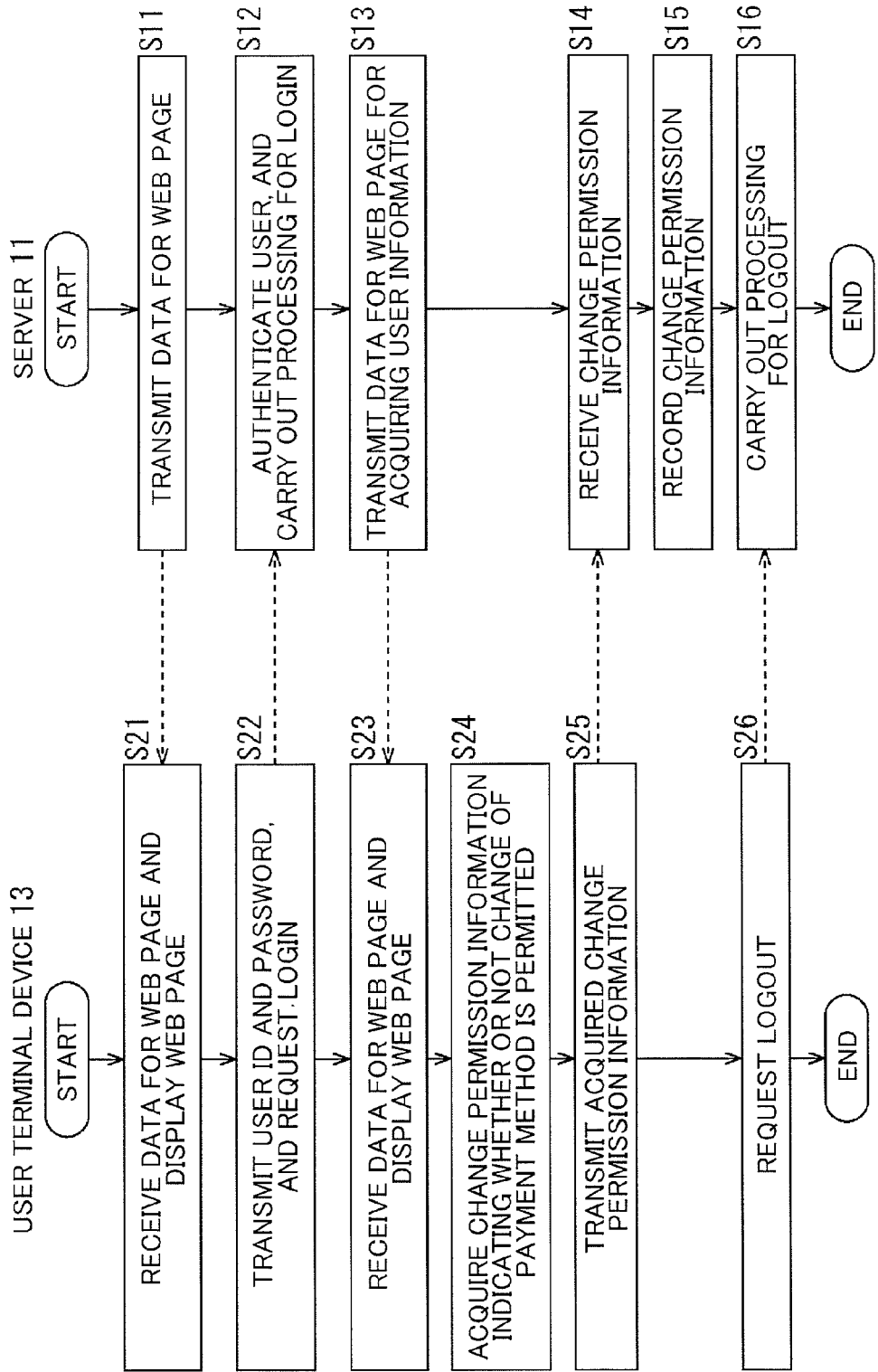

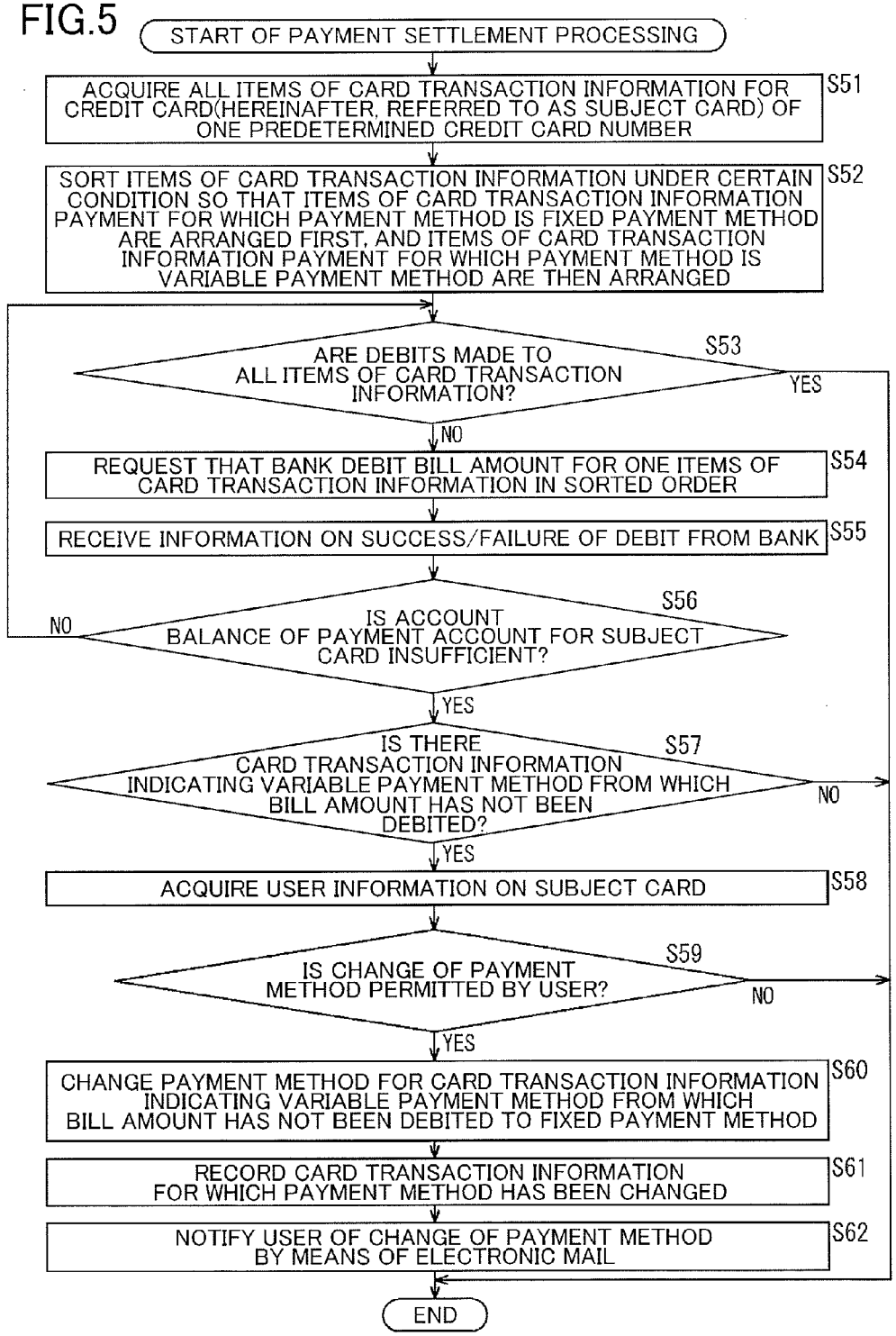

INFORMATION PROCESSING DEVICE, INFORMATION PROCESSING METHOD, PROGRAM AND STORAGE MEDIUM

CROSS REFERENCE TO RELATED APPLICATIONS

This application is a National Stage of International Application No. PCT/JP2010/070687 filed Nov. 19, 2010, claiming priority based on Japanese Patent Application No. 2009-266688 filed Nov. 24, 2009, the contents of all of which are incorporated herein by reference in their entirety.

TECHNICAL FIELD

The present invention relates an information processing device, an information processing method, a program, and a storage medium, and more particularly, to an information processing device, an information processing method, a program, and a storage medium for processing a payment settlement for a credit card.

BACKGROUND ART

The credit card is widely used for a payment settlement such as a purchase of an article.

If a card company issuing credit cards requests that a bank pay a bill amount from a payment account of a credit card, and the account balance of the payment account is insufficient for the bill amount, the bank, which is requested by the card company, does not make a debit from the payment account, and returns an error to the card company. In this case, the card company later mails an invoice to a user of the credit card.

Conventionally, a plurality of methods for payment such as an automatic transfer, a payment over a counter of a bank branch, a payment on a bank ATM, a payment over a counter of a shop, and a payment through a WEB site on the Internet are provided to members, and a temporary member can freely select a method for payment by using a bidirectional computer communication network, and also can select an amount of payment each time (see Patent Literature 1, for example). In this case, there is further provided a mechanism which processes a sale to which a clear payment is specified upon a transaction as a clear payment until an end of a month next to the transaction, and automatically includes a balance which has not been paid until then into a revolving balance, thereby allowing a member to control the payment according to an own financial state.

PRIOR ART DOCUMENT

Patent Document

[Patent Document 1]: JP 2002-183445 A

DISCLOSURE OF THE INVENTION

Problems to be Solved by the Invention

However, if an account balance is insufficient for a bill amount on a due date, or if an invoice sent later is lost, and the due date of the payment is over, information indicating the delay of payment (so-called accident information) is recorded to credit information of the user. Moreover, in order to avoid the situation in which an account balance is insufficient for a bill amount on a due date, it is always necessary to make sure the bill amount and the account balance, which is complicated and time consuming, resulting in a burden on the user.

A balance after the paid amount is subtracted may be automatically included in a revolving balance by using the technology described in Patent Literature 1, but from the user's viewpoint, an unpaid balance, namely, a difference between the paid amount and the bill amount is collectively included in the revolving balance, and the amount of balance included in the revolving balance is thus not clear, and a bill amount to be paid next time tends to be unclear.

The present invention is made in view of the foregoing circumstances, and enables a user to always and easily recognize an amount to be paid by the user, which results in a reduction of the burden imposed on the user.

Means for Solving the Problems

According to an aspect of the present invention, there is provided an information processing device, including: request means for requesting that a bank debit a bill amount of an item of transactions of a credit card from a payment account of the credit card; balance determination means for determining whether or not a balance of the payment account is insufficient for the bill amount of the item of transactions of the credit based on a notification of a result of the debit from the bank; and change means for changing, when it is determined that the balance of the payment account is insufficient, a payment method for a bill amount of at least one item of the transactions, which is a method of making a payment with a payment unit that varies for each item of transactions depending on an amount of the item of transactions of the credit card, to a fixed payment method, which is a method of paying a predetermined fixed amount of money as a unit.

According to another aspect of the present invention, the information processing device further includes change permission determination means for determining whether or not a change of the payment method is permitted when it is determined that the balance of the payment account is insufficient, in which the change means changes, when it is determined that the change of the payment method is permitted, the payment method for the bill amount of the at least one item of the transactions which uses the variable payment method to the fixed payment method.

According to still another aspect of the present invention, the information processing device further includes acquisition means for acquiring transaction information indicating the transactions of the credit card, in which the request means requests that the bank debit, from the payment account, a bill amount of an item of the transactions for which the payment method is the fixed payment method before a bill amount of an item of the transactions for which the payment method is the variable payment method.

According to yet another aspect of the present invention, the information processing device further includes sort means for sorting items of the transactions so that an item of the transactions for which the payment method is the fixed payment method is arranged first, and an item of the transactions for which the payment method is the variable payment method is then arranged, in which the request means requests that the bank debit bill amounts represented by the transaction information from the payment account in an order of the sorted items of the transactions.

According to yet another aspect of the present invention, the sort means sorts the items of the transactions so that an item of the transactions for which the payment method is the fixed payment method is arranged first, and then an item of the transactions for which the payment method is the variable payment method are arranged in an ascending order of the bill amount.

According to yet another aspect of the present invention, the sort means sorts the items of the transactions so that an item of the transactions for which the payment method is the fixed payment method is arranged first, and then an item of the transactions for which the payment method is the variable payment method are arranged in an ascending order of an interest to be generated at the time of debit.

According to yet another aspect of the present invention, the sort means sorts the items of the transactions so that an item of the transactions for which the payment method is the fixed payment method is arranged first, and then an item of the transactions for which the payment method is the variable payment method are arranged in an ascending order of a total sum of interests to be generated until completion of the payment.

According to an aspect of the present invention, there is provided an information processing method for an information processing device including request means, balance determination means, and change means, the information processing method including the steps of: requesting, by the request means, that a bank debit a bill amount of an item of transactions of a credit card from a payment account of the credit card; determining, by the balance determination means, whether or not a balance of the payment account is insufficient for the bill amount of the item of transactions of the credit based on a notification of a result of the debit from the bank; and changing, by the change means, when it is determined that the balance of the payment account is insufficient, a payment method for a bill amount of at least one item of the transactions which uses a variable payment method to a fixed payment method, which is a method of making a payment with a payment unit that varies for each item of transactions depending on an amount of the item of transactions of the credit card, to a fixed payment method, which is a method of paying a predetermined fixed amount of money as a unit.

According to an aspect of the present invention, there is provided a program for causing a computer to execute processing including the steps of: requesting that a bank debit a bill amount of an item of transactions of a credit card from a payment account of the credit card; determining whether or not a balance of the payment account is insufficient for the bill amount of the item of transactions of the credit based on a notification of a result of the debit from the bank; and changing, when it is determined that the balance of the payment account is insufficient, a payment method for a bill amount of at least one item of the transactions which uses a variable payment method to a fixed payment method, which is a method of making a payment with a payment unit that varies for each item of transactions depending on an amount of the item of transactions of the credit card, to a fixed payment method, which is a method of paying a predetermined fixed amount of money as a unit.

According to an aspect of the present invention, there is provided an information recording medium having a program stored thereon for causing a computer to execute processing including the steps of: requesting that a bank debit a bill amount of an item of transactions of a credit card from a payment account of the credit card; determining whether or not a balance of the payment account is insufficient for the bill amount of the item of transactions of the credit based on a notification of a result of the debit from the bank; and changing, when it is determined that the balance of the payment account is insufficient, a payment method for a bill amount of at least one item of the transactions which uses a variable payment method to a fixed payment method, which is a method of making a payment with a payment unit that varies for each item of transactions depending on an amount of the item of transactions of the credit card, to a fixed payment method, which is a method of paying a predetermined fixed amount of money as a unit.

Effect of the Invention

As described above, according to the aspect of the present invention, the user can more surely make a payment.

Further, according to the aspect of the present invention, it is possible to enable a user to always and easily recognize an amount to be paid by the user, which results in a reduction of the burden imposed on the user.

BRIEF DESCRIPTION OF THE DRAWINGS

[FIG. 4] A flowchart illustrating processing of acquiring change permission information.

[FIG. 5] A flowchart illustrating processing for a payment settlement.

MODE FOR CARRYING OUT THE INVENTION

Figure 1:
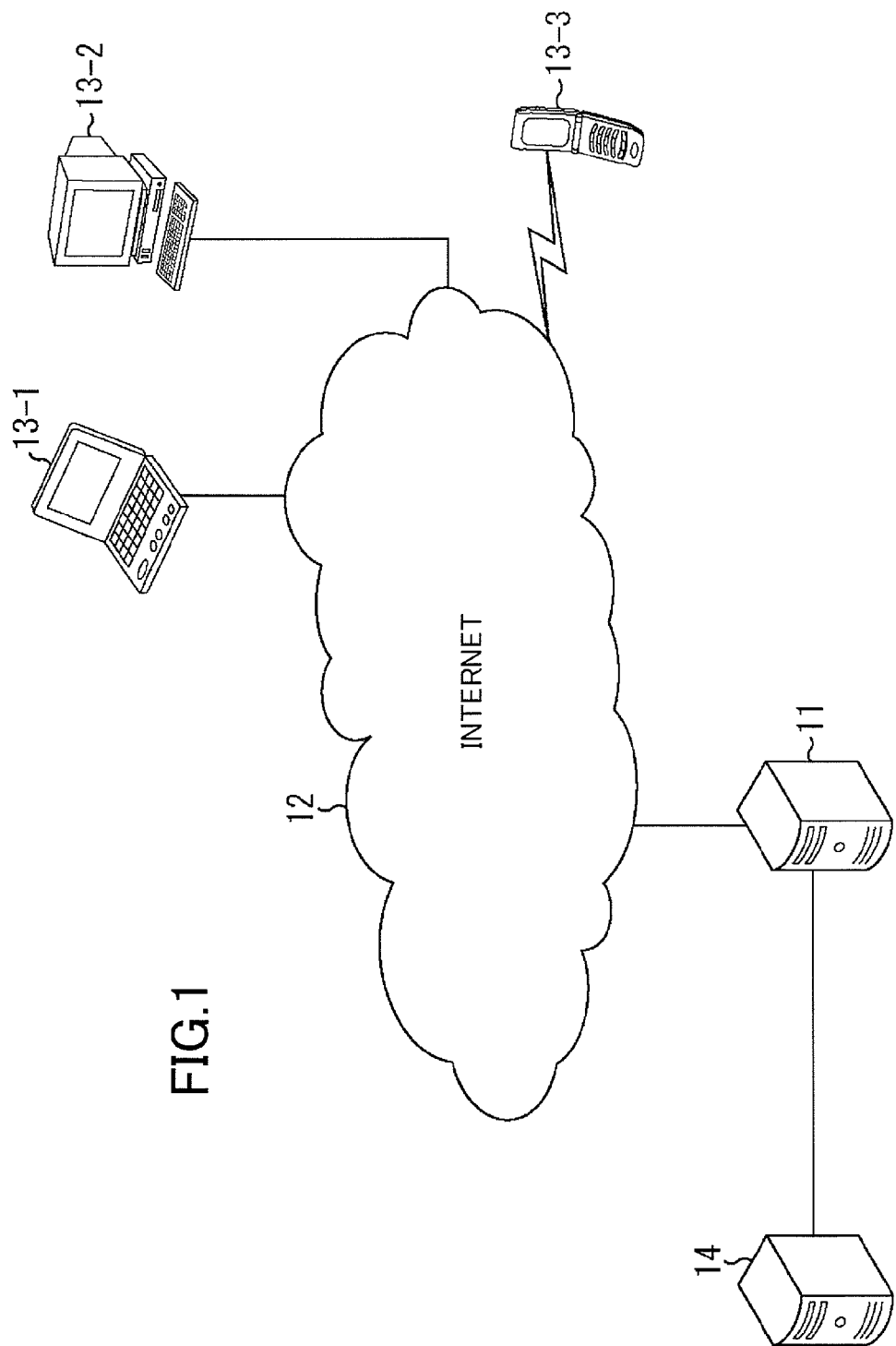
[FIG. 1] A diagram illustrating a configuration of a payment settlement system according to an embodiment of the present invention.

A description is now given of an embodiment of the present invention, and the following section exemplifies a correspondence between components of the present invention and the embodiment described in the detailed description of the invention. This description is intended to ensure that an embodiment supporting the present invention is described in the detailed description of the invention. Even if there is an embodiment which is described in the detailed description of the invention, but is not described herein as an embodiment corresponding to the component of the present invention, this fact does not mean that the embodiment does not correspond to the component. Conversely, even if an embodiment is described herein so as to correspond to a component, this fact does not mean the embodiment does not correspond to a component other than that component.

An information processing device according to an aspect of the present invention includes request means (debit requesting module 72 in FIG. 3, for example) for requesting that a bank debit each bill amount of an item of transactions of a credit card from a payment account of the credit card, balance determination means (balance determination module 81 in FIG. 3, for example) for determining whether or not a balance of the payment account is insufficient for a bill amount for each of transactions based on a notification of a result of the debit from the bank, change permission determination means (change permission determination module 82 in FIG. 3, for example) for determining whether or not a change of a payment method is permitted when it is determined that the balance of the payment account is insufficient, and change means (change module 74 in FIG. 3, for example) for changing the payment method for a bill amount of an item of transactions which uses a variable payment method to a fixed payment method when it is determined that the change of the payment method is permitted, the fixed payment method being a method of paying a predetermined fixed amount of money a unit (revolving payment, for example), the variable payment method being a method of making a payment with a payment unit that varies for each transaction depending on an amount of the transaction of the credit card (installment payment, for example).

Acquisition means (payment settlement processing module 66 in FIG. 3, for example) for acquiring transaction information (card transaction information, for example) representing the transaction of the credit card, and sort means (sort module 71 in FIG. 3, for example) for sorting items of the transactions so that an item of the transactions for which the payment method is the fixed payment method is arranged first, and an item of the transactions for which the payment method is the variable payment method is then arranged are further provided, and the request means is capable of requesting that the bank debit the bill amount represented by the transaction information from the payment account in the order of the sorted items of transaction information.

An information processing method according to an aspect of the present invention is an information processing method for an information processing device including request means (debit requesting module 72 in FIG. 3, for example), balance determination means (balance determination module 81 in FIG. 3, for example), change permission determination means (change permission determination module 82 in FIG. 3, for example), and change means (change module 74 in FIG. 3, for example), the information processing method including requesting, by the request means, that a bank debit each bill amount of an item of transactions of a credit card from a payment account of the credit card (procedure in Step S54 in FIG. 5, for example), determining, by the balance determination means, whether or not a balance of the payment account is insufficient for the bill amount for each of transactions based on a notification of a result of the debit from the bank (procedure in Step S56 in FIG. 5, for example), determining, by change permission determination means, whether or not a change of the payment method is permitted when it is determined that the balance of the payment account is insufficient (procedure in Step S59 in FIG. 5, for example), and changing, by the change means, a payment method for a bill amount of an item of transactions which uses a variable payment method to a fixed payment method when it is determined that the change of the payment method is permitted, the fixed payment method (revolving payment, for example) being a method of paying a predetermined fixed amount of money as a unit, the variable payment method (lump-sum payment/installment payment, for example) being a method of making a payment with a payment unit that varies for each of transactions depending on an amount of the transaction of a credit card (procedure in Step S60 in FIG. 5, for example).

A program according to an aspect of the present invention causes a computer to carry out processing including the steps of requesting that a bank debits a bill amount of an item of transactions of a credit card from a payment account of the credit card (procedure in Step S54 in FIG. 5, for example), determining whether or not a balance of the payment account is insufficient for the bill amount for each of transactions based on a notification of a result of the debit from the bank (procedure in Step S56 in FIG. 5, for example), determining whether or not a change of the payment method is permitted when it is determined that the balance of the payment account is insufficient (procedure in Step S59 in FIG. 5, for example), and changing a payment method for a bill amount of an item of transactions which uses a variable payment method to a fixed payment method when it is determined that the change of the payment method is permitted, the fixed payment method (revolving payment, for example) being a method of paying a predetermined fixed amount of money as a unit, the variable payment method (installment payment, for example) being a method of making a payment with a payment unit that varies for each of transactions based on the amount of the transaction of a credit card (procedure in Step S60 in FIG. 5, for example).

FIG. 1 is a diagram illustrating a configuration of a payment settlement system according to an embodiment of the present invention. The payment settlement system settles a payment from a user to a card company by the card company's debiting the payment from a payment account of the user.

The payment settlement system includes a server 11 for requesting a debit of a payment from the payment account of the user of the credit card, user terminal devices 13-1 to 13-3 connected to the server 11 via the Internet 12, and an online system 14 provided in a bank at which the payment account of the user is opened. The server 11 and the online system 14 are connected with each other via a dedicated line. On this occasion, the payment account out of accounts in the bank is an account specified by the user for payments by the credit card.

The server 11 is an example of the information processing device, and is constituted by a dedicated server, a personal computer, a virtual server, or the like. The server 11 may be a system constituted by a combination of a dedicated server, a personal computer, a virtual server, and the like. The server 11 requests, via the dedicated line, that the online system 14 debit a bill amount for each of transactions of the credit card from the payment account of the credit card, and determines, based on a notification of the debit from the online system 14, whether or not the balance of the payment account is insufficient for the bill amount for each of the transactions. When it is determined that the balance of the payment account is insufficient, the server 11 then changes the payment method for the bill amount of the transaction from the variable payment method to the fixed payment method between those two payment methods.

The fixed payment method is a method in which a fixed amount of money predetermined by a card company or a user of a credit card is paid as a unit, and is a payment method including the revolving payment and the flex payment on this occasion. It may be considered that the revolving payment includes a payment method in which a predetermined amount of money is paid each month, a payment method in which an amount of money and an interest in predetermined ratios to a debt amount are paid each month, and a payment method in which a fixed amount predetermined with respect to a debt amount is paid each month. The flex payment is a payment method in which an amount repaid added by a user to a predetermined fixed amount of money can be paid.

Moreover, the variable payment method is a payment method in which a payment unit varies for each of transactions based on the amount of the transaction by a credit card, and refers to a payment method including, for example, the lump-sum payment in which a bill amount is paid at once, the installment payment in which payment is made several times (including an add-on payment), and the bonus payment which a bonus is used for a payment.

It should be noted that the payment method refers to a method of a payment from a user holding a credit card to a card company, including the fixed payment method and the variable payment method.

The user terminal devices 13-1 to 13-3 are information terminal devices such as personal computers and cellular phones, and are respectively operated by the users of the credit cards, and provide the server 11 with user information, which is information on the each credit card of the users via the Internet 12.

The online system 14 is constituted by computer systems connected with one another via a network or a dedicated line, and carries out processing such as a deposit and a debit on an account of the user.

It should be noted that the Internet 12 is an example of a network, and a connection between the server 11 and the user terminal devices 13-1 to 13-3 is not limited to the Internet 12, and may be a connection via a network such as a local area network (LAN) or a wide area network (WAN) constituted by a wired or wireless general-purpose or dedicated line. Moreover, the server 11 and the online system 14 may be connected via the Internet 12 or a general-purpose line.

When it is not necessary to individually distinguish the user terminal devices 13-1 to 13-3, the user terminal devices 13-1 to 13-3 are simply referred to as user terminal device 13 hereinafter.

Figure 2:
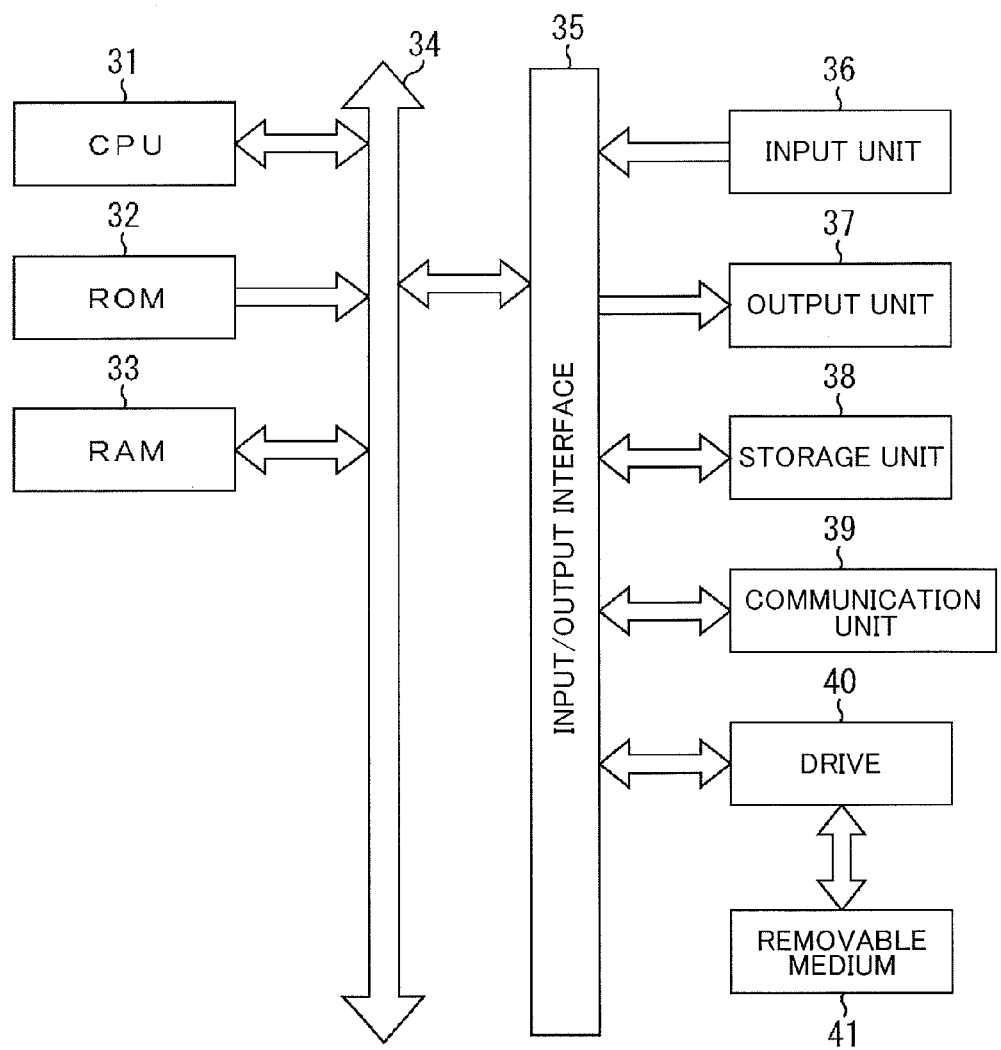
[FIG. 2] A block diagram illustrating a configuration example of hardware of a server 11.

FIG. 2 is a block diagram illustrating a configuration example of hardware of the server 11.

The central processing unit (CPU) 31, a read only memory (ROM) 32, and a random access memory (RAM) 33 are connected with one another via a bus 34 in the server 11.

An input/output interface 35 is further connected to the bus 34. An input unit 36 constituted by a keyboard, a mouse, a microphone, and the like, an output unit 37 constituted by a display, a speaker, and the like, a storage unit 38 constituted by a hard disk, a non-volatile memory, and the like, a communication unit 39 constituted by a network interface, a communication device for a dedicated line, and the like, and a drive 40 for driving a removable medium 41 such as a magnetic disk, an optical disc, a magneto-optical disc, or a semiconductor memory are connected to the input/output interface 35.

In the server 11 (computer) constituted as described above, a series of processing described later is carried out by the CPU 31 loading a program stored in the storage unit 38, for example, via the input/output interface 35 and the bus 34, on the RAM 33, and executing the program.

The program executed by the server 11 (CPU 31) is provided while the program is recorded on the removable medium 41, which is a package medium constituted by a magnetic disk (including a flexible disk), an optical disc (such as compact disc-read only memory (CD-ROM) and digital versatile disc (DVD)), a magneto-optical disc or a semiconductor memory, or a wired or wireless transmission medium such as a local area network, the Internet 12, or a digital satellite broadcast.

The program can then be installed on the computer by mounting the removable medium 41 on the drive 40, and storing the program in the storage unit 38 via the input/output interface 35. Moreover, the program may be installed in the computer by the communication unit 39 receiving the program via a wired or wireless transmission medium, and by storing the program in the storage unit 38. Moreover, the program may be installed on the computer in advance by storing the program in the ROM 32 or the storage unit 38 in advance.

Figure 3:
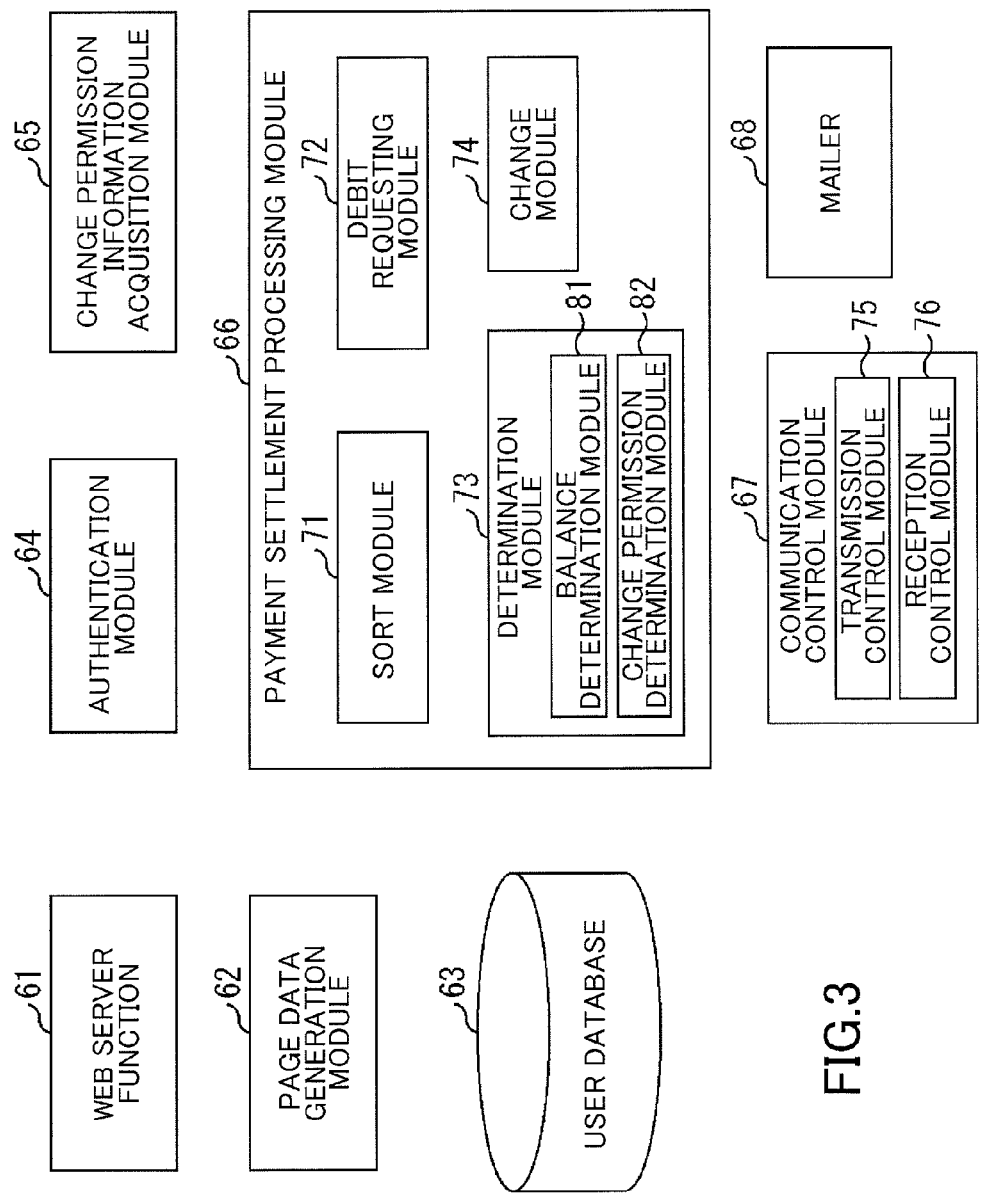
[FIG. 3] A block diagram illustrating a configuration of functions realized by the server 11.

FIG. 3 is a block diagram illustrating a configuration of functions realized by the server 11 executing the program. In other words, when the server 11 executes the program, a Web server function 61, a page data generation module 62, a user database 63, an authentication module 64, a change permission information acquisition module 65, a payment settlement module 66, a communication control module 67, and a mailer 68 are realized.

The Web server function 61 is realized by executing a so-called Web server program such as the Apache HTTP Server, and provides data for a Web page such as the hypertext markup language (HTML) type or the extensible markup language (XML) type including various objects such as texts and images based on a procedure defined in the hypertext transfer protocol (HTTP).

The page data generation module 62 generates data for Web pages provided by the Web server function 61.

The user database 63 stores a name, an address, a telephone number, an electric mail address, a user ID for identifying each user, a password for login, and card transaction information, which is information on individual transactions of a credit card, of a user of the credit card for each of the users. The card transaction information contains a credit card number, payments made to shops and the like as results of transactions using the credit card having the credit card number, dates of the transactions, names of the shops and the like, payment methods, each of which is any one of the fixed payment method and the variable payment method, and monthly bill amounts.

The authentication module 64 authenticate a user by checking the user ID and the password of the user. The change permission information acquisition module 65 acquires change permission information indicating whether or not a user permits a change of the payment method out of user information transmitted from the user terminal device 13 via the Internet 12 depending on an operation by the user. The acquired change permission information is stored in the user database 63 while the change permission information is associated with the user ID of the user.

The payment settlement processing module 66 carries out processing for settlement of a payment from a user of a credit card to a card company. The payment settlement processing module 66 includes the sort module 71, the debit requesting module 72, a determination module 73, and the change module 74. The sort module 71 sorts items of card transaction information read out and acquired from the user database 63 so that items of the card transaction information for which the payment method is the fixed payment method are arranged first, and items of the card transaction information for which the payment method is the variable payment method are then arranged.

The debit requesting module 72 requests that the online system 14 of the bank debit a bill amount for each transaction by a credit card from a payment account of the credit card in the order of sorted items of card transaction information. The determination module 73 makes various determinations. The determination module 73 includes the balance determination module 81 and the change permission determination module 82.

The balance determination module 81 determines, based on a notification of a result of a debit from the online system 14 of the bank, whether or not the balance of the payment account is insufficient for the bill amount of each transaction. The change permission determination module 82 determines whether or not a change of the payment method is permitted by the user by referring to the change permission information.

When it is determined that the balance of the payment account is insufficient, the change module 74 changes the payment method for the bill amount of the transaction which uses the variable payment to the fixed payment method. In more detail, when it is determined that the balance of the payment account is insufficient, the change module 74 rewrites information, which is used to specify any one of the fixed payment method and the variable payment method and is written in the card transaction information, and which is used to specify the variable payment method, so as to specify the fixed payment method. The change module 74 causes the user database 63 to store this card transaction information.

The communication control module 67 controls the communication module unit 39, which is a communication device for the dedicated line, thereby controlling communication with the online system 14 via the dedicated line. The communication control module 67 includes a transmission control module 75 and a reception control module 76. The transmission control module 75 controls transmission of various data and signals to the online system 14 via the dedicated line. The reception control module 76 controls reception of various data and signals transmitted from the online system 14 via the dedicated line.

The mailer 68 is realized by executing a so-called mail program, and transmits electronic mails for various notifications to a user.

A description is now given of the acquisition of the change permission information.

FIG. 4 is a flowchart illustrating processing for acquiring the change permission information. In Step S11, the Web server function 61 of the server 11 causes the communication module 39 serving as a network interface to transmit data for a Web page for login to the user terminal device 13 as a response to a request from the user terminal device 13 via the Internet 11. In Step S21, the user terminal device 13 receives the data for the Web page transmitted from the server 11, and displays the Web page.

When a user ID and a password are input on the Web page for the login displayed based on an operation of the user, and the login is instructed, the user terminal device 13 transmits the input user ID and password to the server 11, and requests the login via the Internet 12 in Step S22. In Step S12, the Web server function 61 of the server 11 causes the communication unit 39 serving as the network interface to receive the user ID and the password transmitted from the user terminal device 13, and supplies the authentication module 64 with the received user ID and password, thereby requesting the authentication. The authentication module 64 authenticates the user of the user terminal device 13 by checking the received user ID and the password against the user ID and the password stored in the user database 63. As a result, the user of the user terminal device 13 is identified.

When the check of the user ID and the password fails, the user of the user terminal device 13 is not authenticated. Accordingly, the processing for the login is not carried out, and subsequent processing is skipped.

In Step S13, the page data generation module 62 generates data for a Web page used to acquire the user information, and supplies the Web server function 61 with the data. The Web server function 61 causes the communication unit 39 serving as the network interface to transmit the data for the Web page used for acquiring the user information to the user terminal device 13 via the Internet 12. In Step S23, the user terminal device 13 receives the data for the Web page transmitted from the server 11, and displays the Web page. The user information contains the change permission information as described above.

When the change permission information is input to the displayed Web page based on an operation of the user such as checking a checkbox, in Step S24, the user terminal device 13 acquires the change permission information which is input to the Web page and which indicates whether or not the user permits a change of the payment method. In Step S25, when the transmission is instructed by an operation of the user, the user terminal device 13 transmits the acquired change permission information to the server 11 via the Internet 12.

In Step S14, the Web server function 61 of the server 11 causes the communication unit 39 serving as the network interface to receive the change permission information transmitted from the user terminal device 13. On this occasion, the Web server function 61 notifies the change permission information acquisition module 65 of the reception of the change permission information. The change permission information acquisition module 65 requests that the Web server function 61 provide the change permission information, and acquires the change permission information from the Web server function 61.

In Step S15, the change permission information acquisition module 65 causes the user database 63 to store the acquired change permission information by associating the change permission information with the user ID of the user.

In Step S26, the user terminal device 13 requests, via the Internet 12, that the server 11 carry out processing for logout based on an operation of the user. In Step S16, the Web server function 61 carries out the processing for the logout in response to the request, and the processing for acquiring the change permission information ends.

The change permission information indicating whether or not the user permits the change of the payment method is acquired in this way, and the change permission information is associated with the user ID, and is stored in the user database 63. It is possible to determine whether or not each of users permits a change to the payment method by referring to the change permission information stored in the user database 63.

In Step S51, a description is now given of the processing for the payment settlement on the server 11 referring to a flowchart in FIG. 5. The payment settlement module 66 acquires all items of the card transaction information for a credit card (referred to as subject card hereinafter) having predetermined one credit card number by reading out the card transaction information from the user database 63.

In Step S52, the sort module 71 of the payment settlement processing module 66 sorts items of the card transaction information so that items of the card transaction information for which the payment method is the fixed payment method are arranged first, and items of the card transaction information for which the payment method is the variable payment method are then arranged.

More specifically, for example, the sort module 71 sorts the items of the card transaction information so that the item of the card transaction information for which the payment method is the fixed payment method is arranged first, and then items of the card transaction information for which the payment method is the variable payment method are arranged in an ascending order of the bill amount. In this case, when bill amounts of three items of the card transaction information for which the payment method is the variable payment method are respectively 50,000 yen, 60,000 yen, and 20,000 yen, for example, the items of the card transaction information indicating the variable payment method are arranged in an order of the card transaction information indicating the bill amount of 20,000 yen, the card transaction information indicating the bill amount of 50,000 yen, and the card transaction information indicating the bill amount of 60,000 yen, following items of the card transaction information for which the payment method is the fixed payment method.

Further, for example, the sort module 71 sorts the items of the card transaction information so that the item of the card transaction information for which the payment method is the fixed payment method is arranged first, and then items of the card transaction information for which the payment method is the variable payment method are arranged in an ascending order of an interest to be generated at the time of debit. In this case, the payment settlement processing module 66 calculates interests to be generated at the time of debit for the respective items of the card transaction information for which the payment method is the variable payment method, and the sort module 71 arranges the items of the card transaction information indicating the variable payment method in an ascending order of the calculated interest, following the items of the card transaction information for which the payment method is the fixed payment method.

Further, for example, the sort module 71 sorts the items of the card transaction information so that the item of the card transaction information for which the payment method is the fixed payment method is arranged first, and then items of the card transaction information for which the payment method is the variable payment method are arranged in an ascending order of a total sum of interests to be generated until completion of the payment. In this case, the payment settlement processing module 66 calculates the total sum of interests to be generated until the completion of the payment for the respective items of the card transaction information for which the payment method is the variable payment method, and the sort module 71 arranges the items of the card transaction information indicating the variable payment method in an ascending order of the calculated total sum of interests, following the items of the card transaction information for which the payment method is the fixed payment method.

In Step S53, the determination module 73 determines whether or not the debit is made for all the items of the card transaction information. When it is determined that the debit is not made for all the items of the card transaction information, the procedure proceeds to Step S54, and the debit requesting module 72 requests that the online system 14 of the bank debit a bill amount based on one item of the card transaction information in the sorted order.

In other words, the debit requesting module 72 selects the first item of the card transaction information for which a bill amount has not been debited yet out of the sorted items of card transaction information. Then the debit requesting module 72 extracts the bill amount from the selected card transaction information. The debit requesting module 72 further causes the transmission control module 75 of the communication control module 67 to transmit data requesting that the online system 14 of the bank debit the extracted bill amount. In other words, on this occasion, the transmission control module 75 controls the communication unit 39, which is the communication device for the dedicated line, to transmit the data requesting that the online system 14 of the bank debit the bill amount.

In Step S55, the reception control module 76 of the communication control module 67 causes the communication unit 39, which is the communication device for the dedicated line, to receive information on the possibility of the debit transmitted from the online system 14 of the bank. In Step S56, the balance determination module 81 of the determination module 73 determines whether or not the account balance of a payment account of a subject card is insufficient for the bill amount, by referring to the information on the possibility of the debit received in the procedure in Step S55. In other words, when the notification of the result of the debit from the bank indicates that the balance of the payment account is insufficient for the bill amount, or indicates that the debit of the bill amount has not been made, the balance determination module 81 determines that the balance of the payment account is insufficient for the bill amount of the transaction, and when the notification of the result of the debit from the bank indicates that the debit of the bill amount has been made, the balance determination module 81 determines that the balance of the payment account is not insufficient for the bill amount of the transaction.

In Step S56, when it is determined that the account balance of the payment account of the subject card is insufficient for the bill amount, the procedure proceeds to Step S57, and the determination module 73 determines whether or not there is a item of the card transaction information indicating the variable payment method for which a bill amount has not been debited. In Step S57, when it is determined that there is a item of the card transaction information indicating the variable payment method for which a bill amount has not been debited, the procedure proceeds to Step S58, and the payment settlement module 66 acquires the user information on a user of the subject card by reading the user information from the user database 63.

In Step S59, the change permission determination module 82 of the determination module 73 determines whether or not the change of the payment method is permitted by the user by referring to the change permission information which is contained in the acquired user information and which indicates whether or not the user permits the change of the payment method.

In Step S59, when it is determined that the user permits the change of the payment method, the procedure proceeds to Step S60, and the change module 74 changes the payment method of the card transaction information of the variable payment method, for which a bill amount has not been debited, to the fixed payment method. In other words, when it is determined that the balance of the payment account is insufficient, the change module 74 changes the payment method for the bill amount of the transaction which uses the variable payment method to the fixed payment method, the fixed payment method being a method of paying a predetermined fixed amount of money as a unit, the variable payment method being a method of making a payment with a payment unit that varies for each transaction depending on an amount of the transaction of a credit card.

In more detail, in Step S60, the change module 74 rewrites the information, for which the bill amount has not been debited, which is used to specify any one of the fixed payment method and the variable payment method and is written in the card transaction information, and which is used to specify the variable payment method, so as to specify the fixed payment method.

In Step S61, the change module 74 associates the changed card transaction information for which the payment method has changed, with the user ID of the user of the subject card, and stores the card transaction information in the user database 36.

In Step S62, the mailer 68 reads an electronic mail address of the user subject to the payment settlement processing from the user database 36 by referring to the user ID of the user, and generates an electronic mail for notifying the user of the change of the payment method. The mailer 68 then notifies the user of the change of the payment method by the electronic mail by transmitting the electronic mail to the user, and the processing for the payment settlement ends.

In Step S56, when it is determined that the account balance of the payment account of the subject card is not insufficient for the bill amount, the procedure returns to Step S53, and the above-mentioned processing is repeated for a next item of the card transaction information.

In Step S53, when it is determined that the debits are made for all the items of the card transaction information, all the bill amounts have been paid. Accordingly, the procedures of Steps S54 to S62 are skipped, and the processing for payment settlement ends.

In Step S57, when it is determined that there is not a card transaction information indicating the variable payment method for which a bill amount has not been debited, there is no item of the card transaction information for which the payment method is to be changed to the fixed payment method. Accordingly, the procedures of Steps S58 to S62 are skipped, and the processing for payment settlement ends.

In Step S59, when it is determined that the user does not permit the change of the payment method, the payment method cannot be changed to the fixed payment method. Accordingly, the procedures of Steps S60 to S62 are skipped, and the processing for the payment settlement ends.

In this way, the payment method is changed to the fixed payment method for only required ones of the bill amounts of the respective transactions with an item of transactions of the card being a unit. The user can thus easily recognize the change of the payment method for each of the transactions of the credit card by viewing the notification of the change of the payment method by the electronic mail, thereby always and easily recognizing an amount of money to be paid by the user himself/herself. Moreover, if the user once permits the change of the payment method, it is not necessary to compare the account balance and the bill amount, and even if a user withdraws money from the payment account immediately before the payment settlement, a delay of the payment will not be written to the credit information of the user, and the burden on the user can be reduced.

The user can easily recognize an amount of money paid by the user himself/herself as described above, and the burden on the user can be reduced.

In this way, when the payment method is changed from the variable payment method to the fixed payment method, the user can more surely make payment. Moreover, the user can always and easily recognize an amount of money paid by the user himself/herself, and the burden on the user can be reduced in a case where a bank is requested to debit a bill amount of an item of transactions of a credit card from a payment account of the credit card, where it is determined whether or not a balance of the payment account is insufficient for the bill amount for each of transactions based on a notification of a result of the debit from the bank and it is determined that the balance of the payment account is insufficient, where it is determined whether or not a change of the payment method is permitted and it is determined that the change of the payment method is permitted, and where a payment method for a bill amount of an item of transactions which uses a variable payment method is changed to a fixed payment method, the fixed payment method being a method of paying a predetermined fixed amount of money as a unit, the variable payment method being a method of making a payment with a payment unit that varies for each transaction depending on an amount of the transaction of a credit card.

The series of the processing as described above may be carried out by hardware, or may be carried out by software. In the case where the series of the processing is carried out by software, a program constituting the software is installed, from a program recording medium, on a computer integrated into dedicated hardware or a general-purpose personal computer, for example, which is capable of carrying out various functions by installing various kinds of programs.

Moreover, the program executed by the computer may be a program in which processing is carried out in a time series based on a sequence described in the specification, or a program in which processing is carried out in parallel or in a required timing upon invocation, or the like.

Moreover, the embodiment of the present invention is not limited to the above-mentioned embodiment, and various changes are possible within a scope without departing from the spirit of the present invention.

For example, the processing for the payment settlement in the server 11 is not limited to the processing illustrated in the flowchart in FIG. 5. Specifically, in the case where the server 11 requests that the bank debit a total of bill amounts calculated based on all items of card transaction information acquired for the credit card, and where the debit cannot be made, the whole of or a part of the items of the card transaction information, to which the variable payment method is specified, may be changed to the fixed payment method out of the items of the card transaction information acquired for the credit card.

The invention claimed is:

1. An information processing device, comprising:
a server, the server comprising:
 a debit requesting module, implemented on a processor, which requests that a bank debit a bill amount of an item of transactions of a credit card from a payment account of the credit card;
 a balance determination module which determines whether or not a balance of the payment account is insufficient for the bill amount of the item of transactions of the credit card based on a notification of a result of the debit from the bank; and
 a change module which changes, when it is determined that the balance of the payment account is insufficient, a payment method for the bill amount of at least one item of the transactions which uses a variable payment method, which is a method of making a payment with a payment unit that varies for each item of transactions depending on an amount of the item of transactions of the credit card, to a fixed payment method, which is a method of paying a predetermined fixed amount of money as a unit.

2. The information processing device according to claim 1, further comprising a change permission determination module which determines whether or not a change of the payment method is permitted when it is determined that the balance of the payment account is insufficient,
 wherein the change module changes, when it is determined that the change of the payment method is permitted, the payment method for the bill amount of the at least one item of the transactions which uses the variable payment method to the fixed payment method.

3. The information processing device according to claim 2, further comprising a payment settlement processing module which acquires transaction information indicating the transactions of the credit card,
 wherein the debit requesting module requests that the bank debit, from the payment account, a bill amount of an item of the transactions for which the payment method is the fixed payment method before a bill amount of an item of the transactions for which the payment method is the variable payment method.

4. The information processing device according to claim 3, further comprising a sort module which sorts items of the transactions so that an item of the transactions for which the payment method is the fixed payment method is arranged first, and an item of the transactions for which the payment method is the variable payment method is then arranged, wherein the debit requesting module requests that the bank debit bill amounts from the payment account in an order of the sorted items of the transactions.

5. The information processing device according to claim 4, wherein the sort module sorts the items of the transactions so that an item of the transactions for which the payment method is the fixed payment method is arranged first, and then an item of the transactions for which the payment method is the variable payment method are arranged in an ascending order of the bill amount.

6. The information processing device according to claim 4, wherein the sort module sorts the items of the transactions so that an item of the transactions for which the payment method is the fixed payment method is arranged first, and then an item of the transactions for which the payment method is the variable payment method are arranged in an ascending order of an interest to be generated at the time of debit.

7. The information processing device according to claim 4, wherein the sort module sorts the items of the transactions so that an item of the transactions for which the payment method is the fixed payment method is arranged first, and then an item of the transactions for which the payment method is the variable payment method are arranged in an ascending order of a total sum of interests to be generated until completion of the payment.

8. An information processing method for an information processing device including a debit requesting module, a balance determination module, and a change module, the information processing method comprising the steps of:
  requesting, by the debit requesting module implemented on a processor, that a bank debit a bill amount of an item of transactions of a credit card from a payment account of the credit card;
  determining, by the balance determination module implemented on a processor, whether or not a balance of the payment account is insufficient for the bill amount of the item of transactions of the credit based on a notification of a result of the debit from the bank; and
  changing, by the change module, when it is determined that the balance of the payment account is insufficient, a payment method for a bill amount of at least one item of the transactions which uses a variable payment method, which is a method of making a payment with a payment unit that varies for each item of transactions depending on an amount of the item of transactions of the credit card, to a fixed payment method, which is a method of paying a predetermined fixed amount of money as a unit.

9. A non-transitory storage medium having a program stored thereon for causing a computer to execute processing comprising the steps of:
  requesting that a bank debit a bill amount of an item of transactions of a credit card from a payment account of the credit card;
  determining whether or not a balance of the payment account is insufficient for the bill amount of the item of transactions of the credit based on a notification of a result of the debit from the bank; and
  changing, when it is determined that the balance of the payment account is insufficient, a payment method for a bill amount of at least one item of the transactions which uses a variable payment method, which is a method of making a payment with a payment unit that varies for each item of transactions depending on an amount of the item of transactions of the credit card, to a fixed payment method, which is a method of paying a predetermined fixed amount of money as a unit.

* * * * *